A. A. CHANTLAND.
ANIMAL TRAP.
APPLICATION FILED MAR. 17, 1911.
1,005,102.
Patented Oct. 3, 1911.
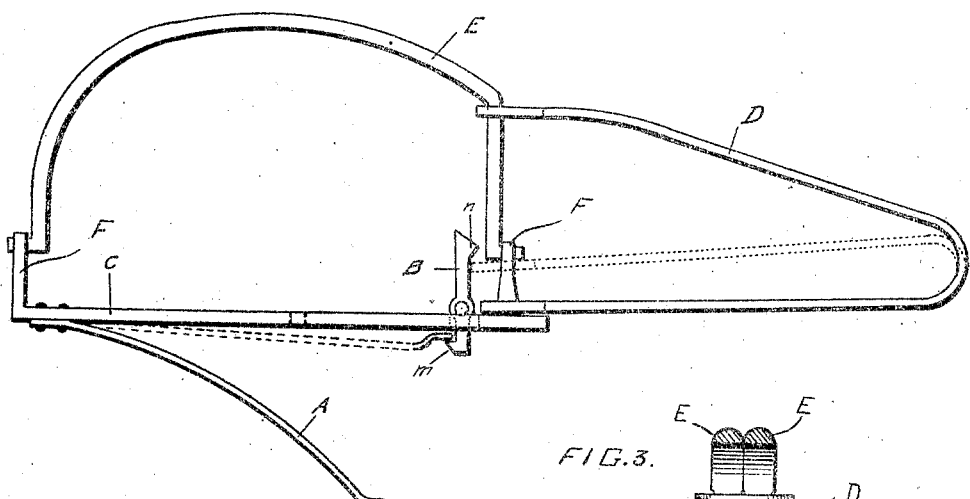
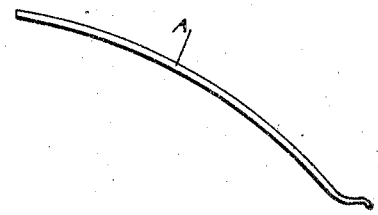
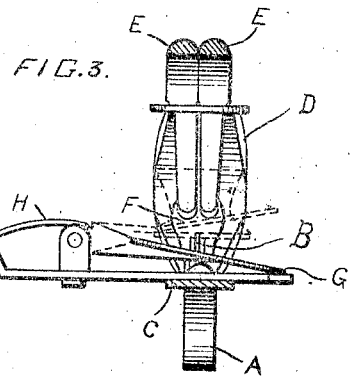
Witnesses.
Andrew A. Chantland
Inventor.

UNITED STATES PATENT OFFICE.

ANDREW A. CHANTLAND, OF BADGER, IOWA.

ANIMAL-TRAP.

1,005,102.  Specification of Letters Patent.  Patented Oct. 3, 1911.

Application filed March 17, 1911. Serial No. 615,156.

*To all whom it may concern:*

Be it known that I, ANDREW A. CHANTLAND, of Badger, in the county of Humboldt and State of Iowa, have invented new and useful Improvements in Animal-Traps, of which the following is a specification.

My invention relates to improvements in animal traps, and pertains more particularly to spring traps of the type disclosed in patent to Stephen R. Leonard, granted on December 16, 1902, Number 716,255.

The object of my invention is to produce an animal trap of said character adapted to be propelled or spring upwardly from the ground toward the prey simultaneously with the action of the clamping jaws.

A further object thereof is to provide an auxiliary spring adapted to be held in confinement by a trigger which is actuated by the main spring by which the clamping jaws are actuated, said auxiliary spring being adapted to throw the trap from the ground to prevent the escape of an animal from the clamping jaws after tripping the actuating mechanism thereof, and a still further object of my invention is to produce a more simple, cheap and efficient animal trap than has heretofore been produced.

To these ends, my invention includes the combinations and arrangement of component parts to be hereinafter described and more particularly pointed out in the claims.

In the accompanying drawings, in which like reference characters indicate similar parts, Figure 1 is a side view of an animal trap showing my improvement with the trigger and detent removed. Fig. 2 is a detail view of the auxiliary spring adapted to propel the trap, and Fig. 3 is a transverse sectional view of my animal trap showing a detent and actuating trigger therefor.

In said drawings, I have shown a trap consisting of a supporting frame C, jaws E, and spring D. Any preferred or suitable means may be employed for holding the jaws against the action of the spring which forms no part of my invention.

In the present embodiment, as shown in Fig. 3 of the drawings, I employ the detent H which coacts with the trigger G to hold or release the jaws.

The supporting-frame C is provided at or adjacent to its opposite ends with uprights F on which the jaws E are pivoted in suitable bearings. The spring D is preferably U-shaped, having one end pivoted on the supporting frame C. The opposite end is provided with an opening through which the jaws E extend as shown.

For the purpose of causing said trap to spring from the ground when actuated, I provide a longitudinally disposed downwardly curved spring A secured at one end on the lower face of the supporting-frame C adjacent to the end opposite to that on which the U-shaped spring D is secured, the free end of which is adapted to press outwardly from the frame C, but which may be confined by the trigger B, hereinafter described.

As shown in the drawing the supporting frame C has an opening intermediate of the uprights F and adjacent to the end on which the spring D is secured thereon. At said opening the frame is pierced by the trigger B which is pivoted on the frame intermediate of its ends, and is provided with the oppositely arranged heads $m$ and $n$ to engage respectively the ends of the spring A and the spring D.

When the jaws E of the trap are released, the tension of the spring D snaps them together above the supporting frame as shown in the full lines of the drawing, and by the same action of the spring D, the head $n$ of the trigger is engaged and pressed backward to actuate the opposite end $m$ to release the spring A which springs outwardly against the ground and throws the entire trap upwardly to catch the animal which actuated the trigger.

Having thus described my invention, what I claim as new and desire to be secured by Letters Patent, is—

1. In an animal trap, the combination with a frame, clamping jaws and a main spring for actuating said jaws, of an auxiliary spring secured on said frame adapted to project the trap from the ground when the jaws are actuated.

2. In an animal trap, the combination with a frame, clamping jaws and a main spring for actuating said jaws, of an auxiliary spring secured on said frame adapted to project the trap from the ground, and means for releasing said auxiliary spring simultaneously with the action of the jaws.

3. In an animal trap, the combination with a frame, clamping jaws and a main spring for actuating said jaws, of an auxiliary spring secured on said frame, a pivoted trigger adapted to confine said auxiliary spring and to be tripped to release same by the action of said main spring, substantially as described.

Signed at Fort Dodge, Iowa, this 13 day of March, 1911.

ANDREW A. CHANTLAND.

Witnesses:
 HARRIETT HUTCHISON,
 ANNA S. CHANTLAND.